(12) United States Patent
Hawkins et al.

(10) Patent No.: US 6,233,087 B1
(45) Date of Patent: May 15, 2001

(54) ELECTRO-MECHANICAL GRATING DEVICE

(75) Inventors: Gilbert A. Hawkins, Mendon; John A. Lebens, Rush; Constantine N. Anagnostopoulos, Mendon; John C. Brazas, Jr., Hilton; Brian E. Kruschwitz; Marek W. Kowarz, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,374

(22) Filed: Dec. 18, 1998

(51) Int. Cl.[7] .................................................. G02B 26/00
(52) U.S. Cl. ......................... 359/290; 359/291; 359/572
(58) Field of Search .................................. 359/290, 291, 359/295, 572, 573, 224

(56) References Cited

U.S. PATENT DOCUMENTS

| 3,886,310 | 5/1975 | Guldberg et al. | 178/7.5 D |
|---|---|---|---|
| 4,360,900 | 11/1982 | Bate | 365/184 |
| 4,492,435 | 1/1985 | Banton et al. | 350/360 |
| 4,662,746 | 5/1987 | Hornbeck | 350/269 |
| 5,311,360 | 5/1994 | Bloom et al. | 359/572 |
| 5,677,783 | 10/1997 | Bloom et al. | 359/224 |
| 5,949,570 | * 9/1999 | Shiono et al. | 359/291 |

OTHER PUBLICATIONS

Anthony E. Ennos, "Stresses Developed in Optical Film Coatings", Optical Society of America, *Applied Optics*, vol. 5(1), 1966, pp. 51–61.

Cabuz et al., "High Reliability Touch–Mode Electrostatic Actuators (TMEA)", Solid–State Sensor and Actuator Workshop, Hilton Head Island, South Carolina, Jun. 1998, pp. 296–299.

DiMaria et al., "Charge Transport and Trapping Phenomena in Off–Stoichiometric Silicon Dioxide Films", *Journal of Applied Physics*, Oct. 1983, pp. 5801–5827.

* cited by examiner

*Primary Examiner*—Georgia Epps
*Assistant Examiner*—Tim Thompson
(74) *Attorney, Agent, or Firm*—Thomas H. Close; Stephen H. Shaw

(57) ABSTRACT

An electro-mechanical grating device for diffracting an incident light beam has a base which defines a surface. A spacer layer is provided above the base, said spacer layer defining an upper surface of said spacer layer. A longitudinal channel is formed in said spacer layer. A plurality of spaced apart deformable ribbon elements are disposed parallel to each other and span the channel. The deformable ribbon elements define a ribbon structure which comprises at least one layer of a single material. The ribbon elements and the electro-mechanical grating device are formed so that charge build-up in layers of the electro-mechanical grating device can be avoided during operation of the device.

25 Claims, 8 Drawing Sheets

ELECTRO-MECHANICAL GRATING DEVICE

CROSS REFERENCE TO RELATED APPLICATIONS

Reference is made to U.S. Ser. No. 09/216,202, filed Dec. 18, 1998, entitled "Process for Manufacturing an Electro-Mechanical Grating Device"; U.S. Ser. No. 09/216,289, filed Dec. 18, 1998, entitled "A Mechanical Grating Device"; U.S. Ser. No. 09/215,106, now U.S. Pat. No. 6,144,481, filed Dec. 18, 1998, entitled "Method and System for Actuating Electro-Mechanical Ribbon Elements in Accordance to a Data Stream"; and U.S. Ser. No. 09/216,054, filed Dec. 18, 1998, entitled "A Mechanical Grating Device with Optical Coating and a Method of Making Mechanical Grating Device with Optical Coating."

FIELD OF THE INVENTION

This invention relates to the field of modulation of an incident light beam by the use of a mechanical grating device. More particularly, this invention is for a movable diffraction grating and the use of improved conducting ribbon structures.

BACKGROUND OF THE INVENTION

Advances in micromachining technology have given rise to a variety of Micro-electromechanical systems (MEMS) including light modulators for low cost display applications. Such modulators provide high-resolution, high operating speeds (kHz frame rates), multiple gray scale levels, color adaptability, high contrast ratio, and compatibility with VLSI technology. One such modulator has been disclosed in U.S. Pat. No. 5,311,360, issued May 10, 1994 to Bloom et al., entitled "Method and Apparatus for Modulating a Light Beam." This modulator is a micromachined reflective phase grating. It consists of a plurality of equally spaced deformable elements in the form of beams suspended at both ends above a substrate thereby forming a grating. The deformable elements have a metallic layer that serves both as an electrode, and as reflective surface for incident light. The substrate is also reflective and contains a separate electrode. Typically the deformable elements are supported a distance of $\lambda/4$ above, and parallel to, the substrate, where $\lambda$ is the wavelength of the incident light source. When the deformable elements are actuated (for example, when a sufficient switching voltage is applied), they are pulled down and the incident light is diffracted. Optical systems can intercept the diffracted light. For display applications, a number of deformable elements are grouped for simultaneous activation thereby defining a pixel, and arrays of such pixels are used to form an image.

U.S. Pat. No. 5,677,783, issued Oct. 14, 1997, to Bloom et al., entitled "Method of Making a Deformable Grating Apparatus for Modulating a Light Beam and Including Means for Obviating Stiction Between Grating Elements and Underlying Substrate" discloses a method of making a deformable grating apparatus for modulating a light beam and including means for obviating stiction between grating elements and underlying substrate. The deformable elements are patterned on top of a sacrificial silicon dioxide film. In order to achieve free-standing beams, the silicon dioxide film is etched away until a supporting frame remains. The last fabrication step provides an aluminum film in order to enhance the reflectance of both the beams and the substrate. To enhance the optical performance of the grating element, dielectric optical coatings may be added using methods that minimize their mechanical effects. The stress can be minimized by alternating materials with compressive and tensile stresses, as discussed by Ennos in "Stresses developed in optical film coatings," published in *Applied Optics* vol. 5 (1966). Silicon dioxide ($SiO_2$) evaporated in vacuum at room temperature can be used as a low-index material with compressive stress, and titanium dioxide ($TiO_2$) evaporated in the same way can be used as a high-index material with tensile stress.

According to the prior art, for operation of the Grating Light Valve (GLV) device, an attractive electrostatic force is produced by a single polarity voltage difference between the ground plane and the conducting layer atop the ribbon layer. This attractive force changes the heights of the ribbons relative to the substrate. By modulating the voltage waveform, it is possible to modulate the diffracted optical beam as needed by the specific application. However, a single polarity voltage waveform can lead to device operation difficulties if leakage or injection of charge occurs into the intermediate dielectric layers between the ground plane and the conductor on the ribbons.

The preferred material for the deformable ribbons in the prior art has been silicon nitride. It is a film that can support an intrinsic tensile stress controlled by the deposition process and that is stable, meaning it does not degrade due to stress relaxation or oxidation over time. However one problem encountered with this material is its tendency to trap charge when a bias is applied across it. If this dielectric charge does not dissipate quickly enough after the actuation voltage is turned off, a significant charge accumulation can occur that leads to deterioration in the performance of the device with repetitive actuation.

Charge injection and trapping into insulating dielectric films, such as silicon nitride and silicon dioxide, on semiconductors is well known to occur in various microelectronic devices. Charging effects in silicon dioxide can be minimized by proper deposition, as described, for example, in "Charge transport and transport phenomena in off-stoichiometric silicon dioxide films," J. Appl. Phys. 54, 1983, pp. 5801–5827, by D. J. Marie et al. On the other hand, charge injection into silicon nitride can be used beneficially in non-volatile memories such as the device described by R. T. Bate; see U.S. Pat. No. 4,360,900, "Non-volatile semiconductor memory elements," issued Nov. 23, 1982. Charge trapping phenomena in rolling contact micro-electromechanical actuators have also been reported by C. Cabuz et al. in "High reliability touch-mode electrostatic actuators (TMEA)," Proc. of Solid-State Sensor and Actuator Workshop, Hilton Head, S.C., Jun. 8–11, 1998, pp. 296–299.

One method to alleviate this problem is to provide an alternating bipolar voltage to the ribbons. A DC-free bipolar waveform produces nearly the same temporal modulation of the diffracted optical beam as the corresponding single polarity waveform while minimizing charge accumulation in the dielectric layers. Stable device operation is thus achieved. However, this complicates the driving circuitry requiring bipolar rather than unipolar driving capability.

SUMMARY OF THE INVENTION

It is the object of the present invention to provide an electro-mechanical grating device which eliminates a potential drop across charging layers, which are part of the electro-mechanical grating device.

The above object is accomplished by an electro-mechanical grating device comprising:

a base having a surface;

a channel formed above said base; and a ribbon structure defining a plurality of spaced apart deformable ribbon elements spanning said channel, said deformable ribbon elements are tensile and reflective, define a top ribbon surface and a bottom ribbon surface and being fabricated of at least one layer opposing the base wherein said layer is conductive.

It is a further object of the present invention to form the ribbon structure of the ribbon elements of the electro-mechanical grating device so that the ribbon structure as a whole is tensile, conductive and reflective and thereby avoids a potential drop across charging layers.

The above object is accomplished by an electro-mechanical grating device comprising:

a base having a surface;

a channel formed above said base; and a plurality of spaced apart deformable ribbon elements spanning the channel, said deformable ribbon elements are formed by a single material layer which is tensile, reflective, and conductive.

This object is further accomplished by an electro-mechanical grating device comprising:

a base having a surface;

a channel formed above said base; and a ribbon structure defining a plurality of spaced apart deformable ribbon elements spanning the channel, said deformable ribbon elements are formed by a three layer structure defining a layer opposing the base, an intermediate layer, and a top layer, wherein the layer opposing the base is conductive, the intermediate layer is tensile, and the top layer is reflective.

This object is also accomplished by an electro-mechanical grating device comprising:

a base having a surface;

a channel formed above said base; and a ribbon structure defining a plurality of spaced apart deformable ribbon elements spanning the channel, said deformable ribbon elements are formed by a three layer structure defining a layer opposing the base, an intermediate layer on top of the layer opposing the base, and a top layer, wherein the layer opposing the base is conductive and reflective, the intermediate layer is transparent, and the top layer is transparent and tensile.

It is another object of the present invention to provide an electro-mechanical grating device which is improved to eliminate a potential drop across charging layers, which are part of the electro-mechanical grating device.

The above object is accomplished by an electro-mechanical grating device comprising:

a base having a surface;

a channel formed above said base;

a ribbon structure defining a plurality of spaced apart deformable ribbon elements spanning said channel, said deformable ribbon elements are tensile and reflective, define a top ribbon surface and a bottom ribbon surface and being fabricated of at least one layer opposing the base is conductive; and a plurality of conductive standoffs patterned on said base in relation to said deformable ribbon elements.

An advantage of the electro-mechanical grating device of the present invention is that a ribbon structure can be constructed to substantially reduce the effects of charge injection into non-conducting layers. The significant effects of charge injection, beam stiction and unstable electro-mechanical operation, will be eliminated.

A further advantage is the need for a simple two-level unipolar drive circuit to achieve standard pulse-width modulation with substantially reduced effect of charge injection.

Additionally, the structure and materials of the device are selected to be compatible with standard CMOS fabrication methods and allow a fabrication process sequence that make the fabrication of the electro-mechanical grating device compatible with the integration of CMOS circuitry.

BRIEF DESCRIPTION OF THE DRAWINGS

The subject matter of the invention is described with reference to the embodiments shown in the drawing.

DETAILED DESCRIPTION OF THE INVENTION

Figure 1:
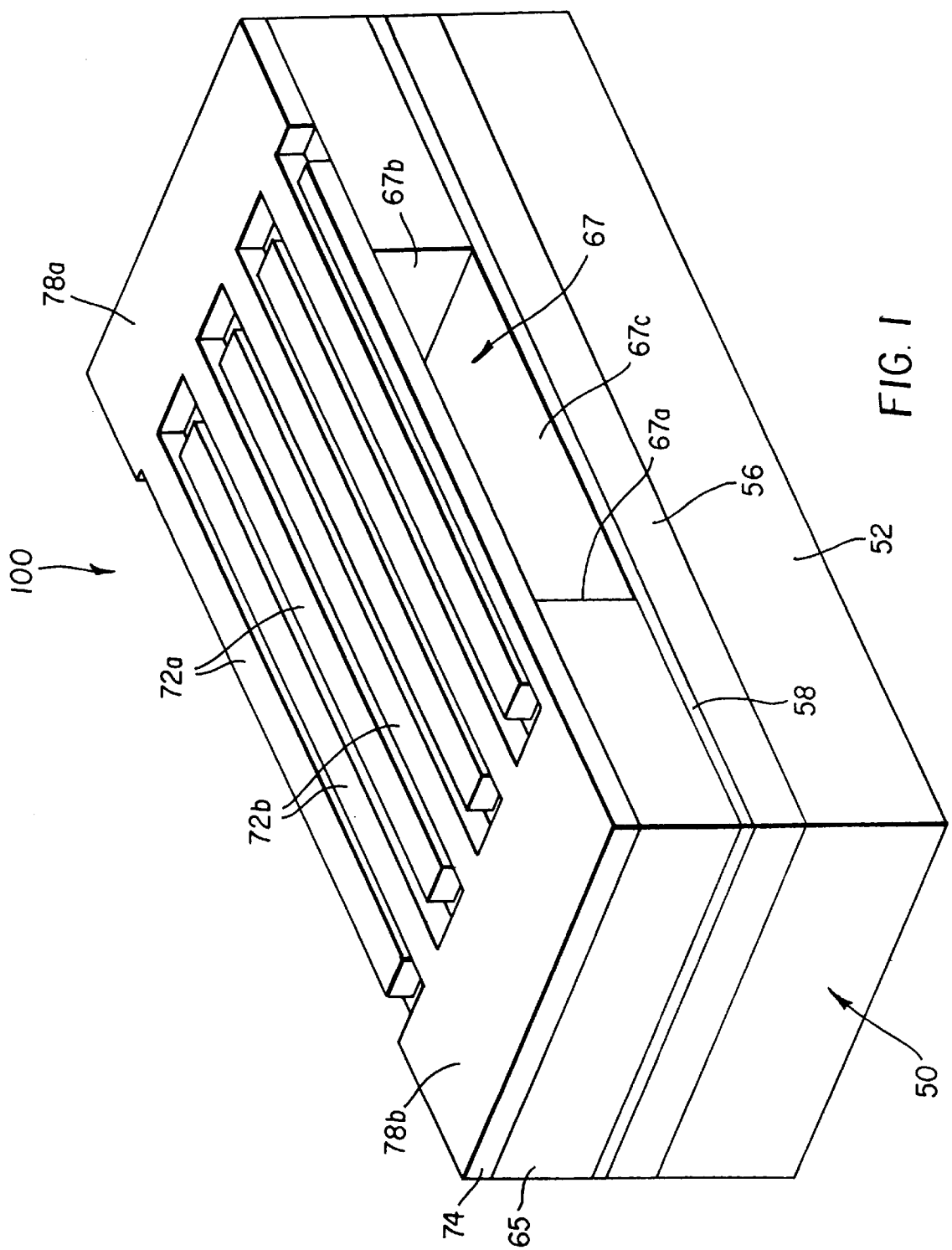
FIG. 1 is a perspective, partially cut-away view of the electro-mechanical grating device of the present invention.

FIG. 1 is a perspective, partially cut-away view of the electro-mechanical grating device 100 of the present invention. The electro-mechanically deformable structures of the electro-mechanical grating device 100 are formed on top of a base 50. The present embodiment as shown in FIG. 1 discloses an electro-mechanical grating device 100 which can be operated by the application of an electrostatic force. Because the actuation force of the electro-mechanical grating device 100 is electrostatic, the base 50 comprises several layers of different materials. The base 50 comprises a substrate 52 that is chosen from the materials glass and silicon. The substrate is covered by a bottom conductive layer 56. In this embodiment the thin bottom conductive layer 56 is necessary because it acts as an electrode for applying the voltage to actuate the electro-mechanical grating device 100. The thin bottom conductive layer 56 is covered by a protective layer 58. The bottom conductive layer 56 is selected from the group consisting of aluminum, titanium, gold, silver, tungsten, silicon alloys, and indium tin oxide. Above the protective layer 58 a spacer layer 65 is formed. On top of the spacer layer 65, a ribbon structure 74 is formed which has the desired characteristics of conductivity, high reflectivity and tensile stress, with a surface opposing the base being conductive.

The spacer layer 65 has a longitudinal channel 67 formed therein. The longitudinal channel 67 comprises a first and second side wall 67a and 67b, and a bottom 67c. The channel 67 is open to the top and covered by a first and a second set of deformable ribbon elements 72a and 72b, each deformable ribbon element 72a and 72b of the first and second set encompasses the ribbon structure 74. Each deformable ribbon element 72a and 72b spans the channel 67 and is secured to the surface of the spacer layer 65 on either side of the channel 67. The bottom 67c of the channel 67 is covered by a protective layer 58. The ribbon structure 74 is patterned such that there is a first and a second region 78a and 78b, each with a comb-like structure, arranged at the surface of the electro-mechanical grating device 100 in an inter-digitated pattern. The first and second region 78a and 78b are mechanically and electrically isolated from one another. As a result there are the first and second set of deformable ribbon elements 72a and 72b spanning the channel 67 and in the direction of the channel 67 are arranged such that every other deformable ribbon element belongs to one set.

For operation of the device, an attractive electrostatic force is produced by a voltage difference between the ground plane 56 and the deformable ribbon elements 72a or 72b. In the unactuated state, with no voltage difference, all of the ribbons in the device are suspended above the substrate at the same height as shown in FIG. 1. A periodic grating is obtained by applying a voltage to fully actuate the ribbons 72a or 72b such that they come in contact with the protective layer 58. When the applied voltage is removed, the force due to the tensile stress and the bending moment restores the ribbons to their original unactuated state.

Figure 2:
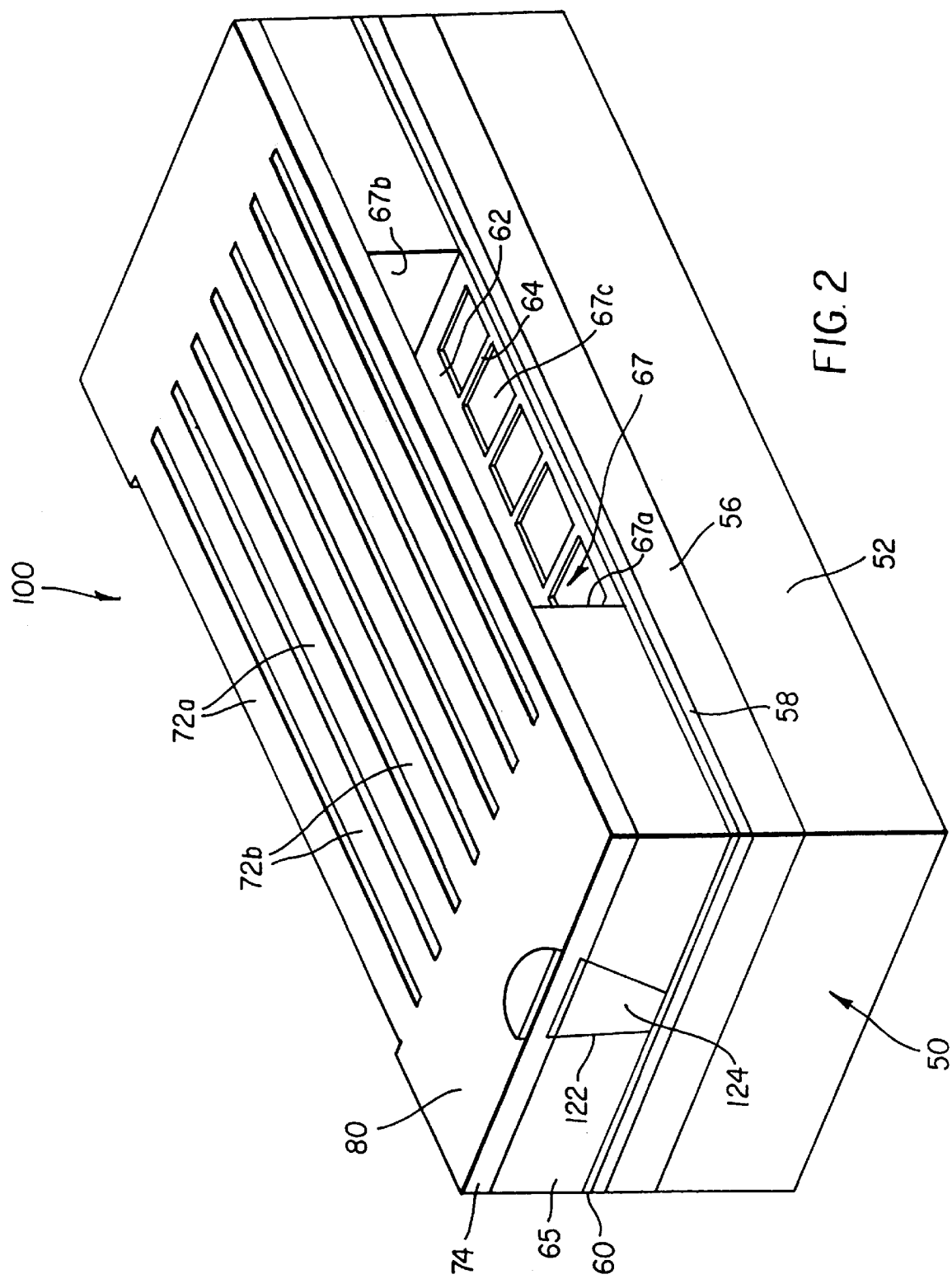
FIG. 2 is a perspective, partially cut-away view of a second embodiment of the electro-mechanical grating device of the present invention.

The embodiment shown in FIG. 1 eliminates the effect of charge build-up in dielectrics, primarily silicon nitride, that are part of the ribbon structure 74, which appears to be the most common scenario for charging. However, it is conceivable that charge can be injected into the protective layer 58 when a conductive ribbon element is used. Alternatively, surface charges can be formed on the surface of the dielectric protective layer through contact with the ribbon elements 72a or 72b. Either scenario would significantly degrade device performance if a sufficient charge is built up. For simplicity all the elements which are similar in both embodiments (FIG. 1 and FIG. 2) are marked with the same reference numeral. FIG. 2 shows a second embodiment of the present invention. Here, the bottom 67c of the channel 67 is provided with a plurality of standoffs 64 and screening features 62. The standoffs 64 and screening features 62 are formed on top of the protective layer 58 and are conductive. The electro-mechanical deformable structures of the electro-mechanical grating device 100 are formed on top of the base 50.

The present embodiment as shown in FIG. 2 discloses an electro-mechanical grating device 100 which can be operated by the application of an electrostatic force. Because the actuation force of the electro-mechanical grating device 100 is electrostatic, the base 50 comprises several layers of different materials. The base 50 comprises a substrate 52 that is chosen from the materials glass and silicon. The substrate is covered by a bottom conductive layer 56. In this embodiment the thin bottom conductive layer 56 is necessary because it acts as an electrode for applying the voltage to actuate the electro-mechanical grating device 100. The thin bottom conductive layer 56 is covered by a protective layer 58. The bottom conductive layer 56 is selected from the group consisting of aluminum, titanium, gold, silver, tungsten, silicon alloys, and indium tin oxide. Above the protective layer 58 a conductive standoff layer 60 is formed of a material selected from the group of aluminum, titanium, gold, silver, tungsten, silicon alloys, and indium tin oxide. Above the conductive standoff layer 60 a spacer layer 65 is formed. On top of the spacer layer 65, a ribbon structure 74 is formed which has the desired characteristics of conductivity, high reflectivity and tensile stress, with the surface opposing the base being conductive.

The spacer layer 65 has a longitudinal channel 67 formed therein. The longitudinal channel 67 comprises a first a second side wall 67a and 67b and a bottom 67c. At the bottom 67c of the channel, the conductive standoff layer 60 is patterned to form conductive screening features 62 and standoffs 64 that take the form of wide lines along the width of the channel connected by narrow lines running in the longitudinal direction of the channel. The conductive standoffs 62 held at the same potential as the ribbon elements 72a and 72b. The actuated device would then induce contact between two conductive surfaces, and injection of surface charge from ribbon elements 72a and 72b to dielectric materials on the substrate 50 would be avoided.

The channel 67 is open to the top and covered by a first and a second set of deformable ribbon elements 72a and 72b. Each deformable ribbon element 72a and 72b spans the channel 67 and is secured to the surface of the spacer layer 65 on either side of the channel 67. The ribbon structure 74 is patterned such that there is a single conducting region 80, with the two alternating sets of ribbon elements 72a and 72b, arranged at the surface of the electro-mechanical grating device 100 and mechanically isolated from one another. As a result there are the first and the second set of deformable ribbon elements 72a and 72b spanning the channel 67 and in the direction of the channel 67 are arranged such that every other deformable ribbon element belongs to one set.

An electrical interconnect between the conducting region 80 and the conductive standoff layer 60 is formed by etching a via hole 122 through the spacer layer 65 and filling with a conductive material 124 before the deposition of the ribbon structure 74. The conductive screening features 62 and standoffs 64 are held at the same potential as the ribbon elements 72a and 72b. The actuated device would then induce contact between two equipotential conductive surfaces, and injection of surface charge from ribbon elements 72a and 72b to dielectric materials on the base 50 is avoided.

Figure 3:
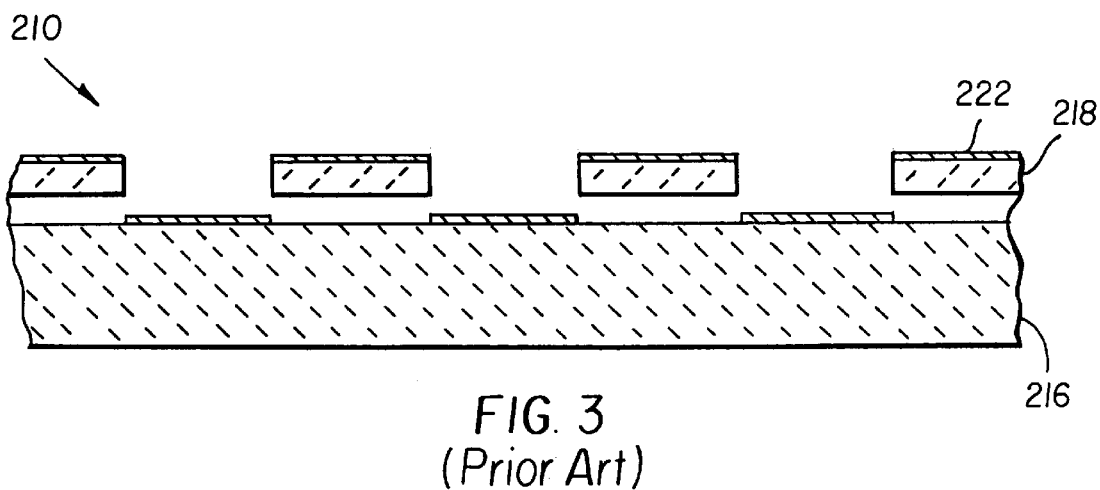
FIG. 3 is a perspective, partially cut-away view of an electro-mechanical grating device from prior art.

FIG. 3 shows a prior art electro-mechanical grating device 210 as described by Bloom et al. in U.S. Pat. No. 5,311,360, issued May 10, 1994, entitled "Method and Apparatus for Modulating a Light Beam." The figure shows a cross-section from a view plane normal to the length of the ribbon elements. The grating device 210 comprises a base 216 above which a plurality of ribbon elements 218 are suspended. The ribbon elements are silicon nitride deposited with a low tensile stress. A thin conductive layer 222 is deposited on top and between the ribbon elements 218 to provide a top electrode and to enhance the reflectivity of the device.

For operation of the device 210, an attractive electrostatic force is produced by a voltage difference between the base 216 and conductive layer 222. This voltage difference leads to a large electric field in the device, typically $10^8$ to $10^9$ V/m depending on material thicknesses and applied voltage. This electric field can cause injection and trapping of charge into any dielectric materials between the top conductive layer 222 and the base 216. In microelectronic devices, charging is known to occur in a variety of insulating thin films including silicon nitride and silicon dioxide. Silicon nitride in particular is very prone to charge injection at modest electric fields, and can be used as a charge storage layer in non-volatile memories because of its long-term charging capability. Charge accumulation on the ribbons of a grating light valve can cause detrimental variations in the operation of the device from one actuation to the next.

Figure 4A:
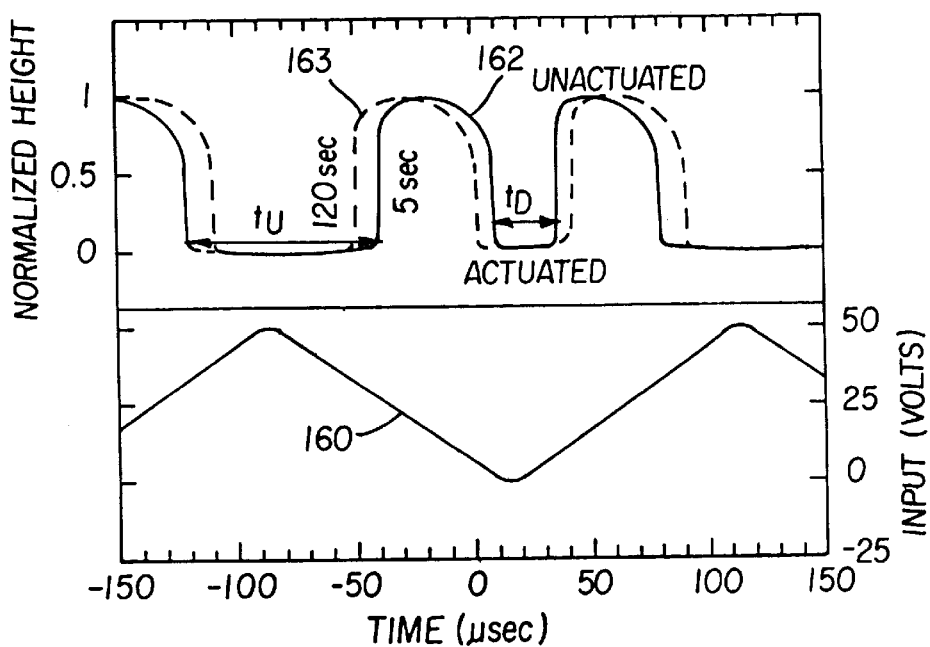
FIGS. 4a–4b show the change in ribbon element behavior due to charging for devices in the prior art with actuation by a unipolar triangular waveform.
Figure 4B:
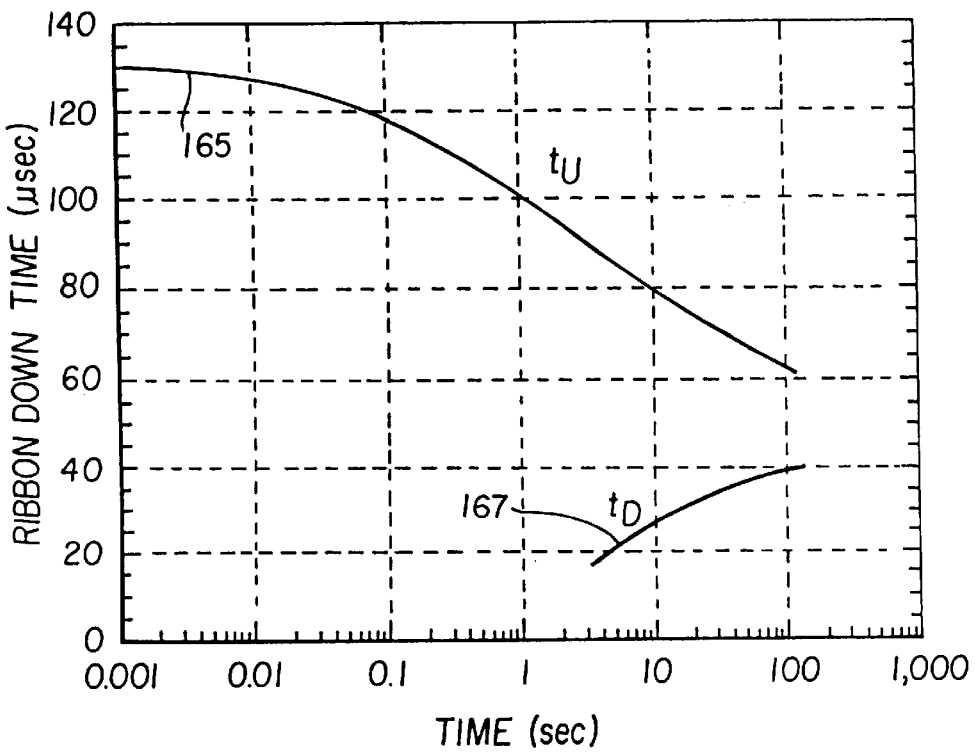

Charge accumulation with repeated actuation was observed on a prior art grating light valve device with a ribbon structure as shown in FIG. 3. A 5 kHz 50V triangular voltage waveform with positive polarity was used to actuate the ribbons into contact with the substrate. A triangular waveform was chosen because it allows the charge accumulation to be quantified by measuring the length of time the ribbons remain in contact with the substrate during each actuation, i.e., the ribbon down time. FIG. 4a shows the applied waveform 160 and the time-dependent position of a single ribbon for two different time delays, 5 and 120 seconds, after the onset of actuation. The behavior of the ribbons is significantly different 120 seconds after actuation 163 than at 5 seconds 162. Measurement of the two time intervals $t_U$ and $t_D$ with a time interval analyzer (TIA) provides a convenient means for monitoring the change in response of the ribbon from one actuation to the next. FIG. 4b shows the measured TIA data as a function of time delay after initial actuation. Before any significant charging occurs 165, the ribbon down time $t_U$ is approximately 130 $\mu$sec and $t_D$ is zero because the ribbons do not actuate during the downward portion of the voltage waveform. After approximately 3 seconds and roughly 15000 actuations, ribbon charging becomes large enough to fully actuate the ribbon when the applied voltage is near zero and $t_D$ becomes non-zero 167. If the applied voltage waveform is turned off past this point, the ribbon will become fully actuated because of the accumulated charge present.

The ribbon structure 74 is one of the unique characteristics of this invention. In order to eliminate the effects of charge trapping by dielectric materials in the beam, ribbon structures are disclosed herein which do not include a charge-trapping dielectric layer on the ribbon structure 74 across which the actuation potential is applied. This is accomplished by using either a completely conductive ribbon structure 74 or a conductive layer on the bottom of the ribbon structure 74. The actuation voltage is applied from an appropriate source 110 to the bottom conductive layer 56, which is adjacent to the bottom 67c of the channel 67 and faces the beam 50.

In this invention it is necessary to provide a dielectric layer on the base (protective layer 58 see FIG. 1) across which a large field will exist due to the actuation voltage. The protective layer 58 can be a high quality thermally-grown silicon dioxide, though, which can withstand a substantially higher electric field before any charge injection occurs as compared to dielectric ribbon materials such as silicon nitride. The various ribbon structures 74 that make up the embodiments of this invention are shown in FIG. 5 through FIG. 11.

Figure 5:
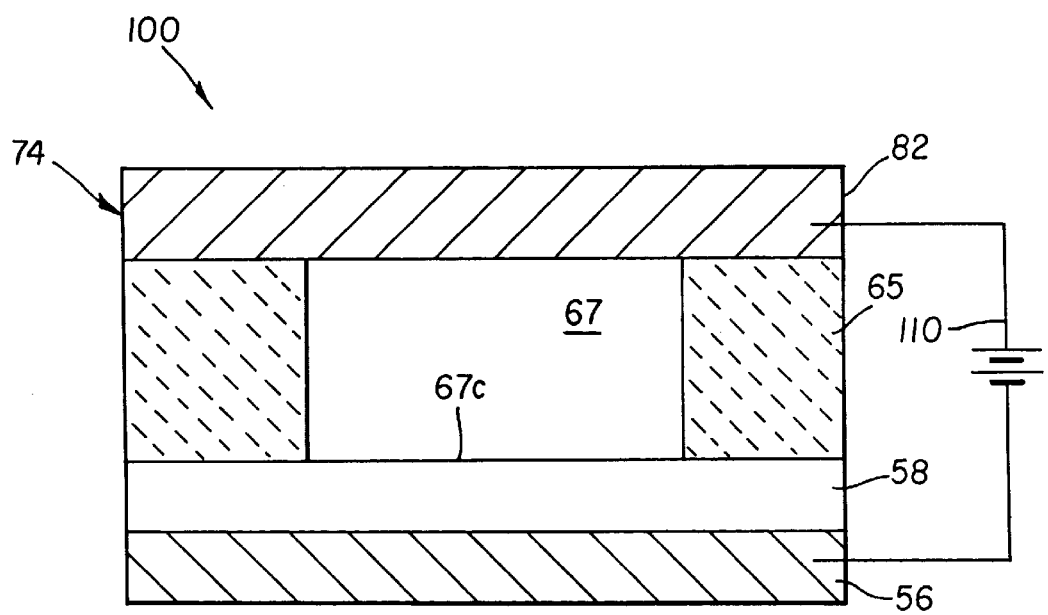
FIG. 5 is a cross-sectional view of the electromechanical grating device having a ribbon structure composed of a single layer.

FIG. 5 is a cross-sectional view of an electro-mechanical device 100 showing a structural drawing that includes the elements for electro-mechanical actuation. The bottom conductive layer 56 is covered by a protective layer 58. Above the protective layer 58 a spacer layer 65 is formed. The spacer layer 65 has a longitudinal channel 67 formed therein. A ribbon structure 74 is formed which includes the desired characteristics of a conductive surface opposing the base 50, reflectivity and tensile stress in a single layer 82. The layer 82 material is selected from a group of materials that includes titanium aluminide, titanium, tantalum, and diamond-like carbon. The thickness of layer 82 is selected to produce the desired mechanical properties of the completed ribbon structure 74. The ribbon structure 74 is patterned as discussed above to produce the useful electro-mechanical device 100.

The thickness and tensile stress of the layer 82 is chosen to optimize performance by influencing the electrostatic force required for actuation and the returning force, which affects the speed, resonance frequency and voltage requirements of the device. Typical characteristics are tensile intrinsic stress greater than 300 MPa and thickness necessary to achieve full actuation with 15 V or less, which corresponds to between 1000 Å and 5000 Å.

Figure 6:
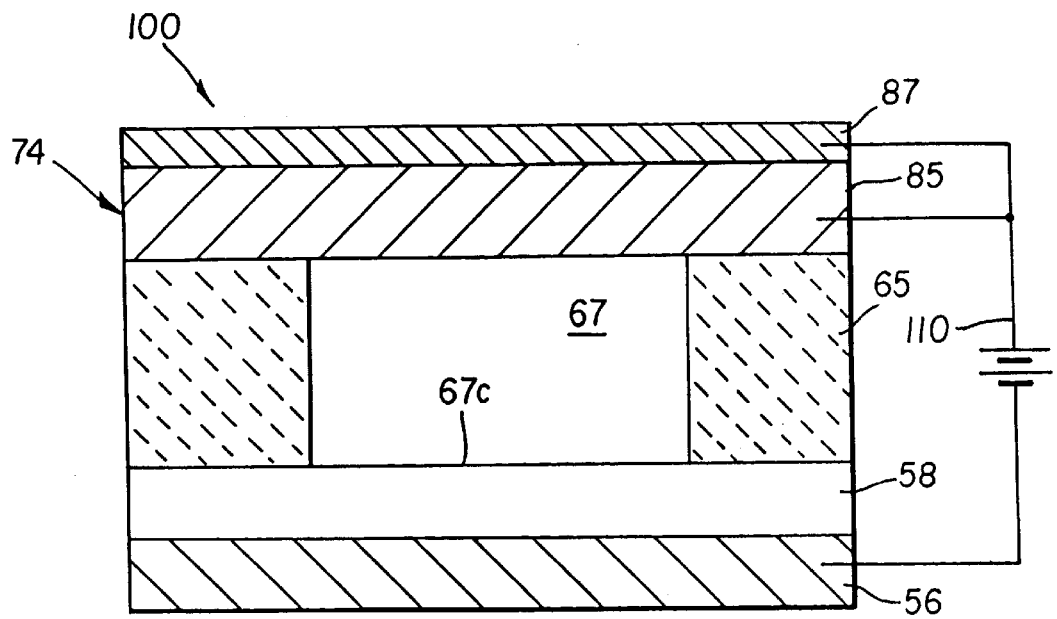
FIG. 6 is a cross-sectional view of the electromechanical grating device having a ribbon structure composed of a tensile-conductive layer and a reflective layer.

FIG. 6 is a cross-sectional view of another electro-mechanical grating device 100 showing a structural drawing that includes the elements for electro-mechanical actuation. The device structure is the same as that of FIG. 5 except for the ribbon structure 74. The ribbon structure 74 is formed to include the desired characteristics of a conductive surface opposing the base 50, reflectivity and tensile stress using two layers. A first layer 85 opposing the bottom 67c of the channel 67 provides conductive and tensile properties of the ribbon structure 74 and a second layer 87 atop the layer opposing the bottom 67c of the channel 67 provides the reflective property. The first layer 84 consists of a material that is selected from a group that includes titanium aluminide, titanium, tantalum, diamond-like carbon, tungsten silicide, titanium nitride, and tantalum nitride. The second layer 87 is selected from a group of materials that includes aluminum, chrome, gold, silver and other standard materials or alloys used for optical mirrors.

The thickness and tensile stress of the first layer 85 is chosen to optimize performance by influencing the electrostatic force required for actuation and the returning force, which affects the speed, resonance frequency and voltage requirements of the device. Typical characteristics are tensile intrinsic stress greater than 300 MPa and thickness necessary to achieve full actuation with 15 V or less, which corresponds to between 1000 Å and 5000 Å. Thickness of the second layer 87 is chosen to provide substantially the largest possible reflection, and is chosen based on the extinction ratio of the material at the wavelength of the incident light. For example, if Al (aluminum) is used for the second layer 87, the thickness should be between 300 Å and 2000 Å for visible wavelengths. The ribbon structure 74 is patterned as discussed above to produce the electro-mechanical device 100 with the electrically and mechanically isolated sets of ribbon elements.

Figure 7:
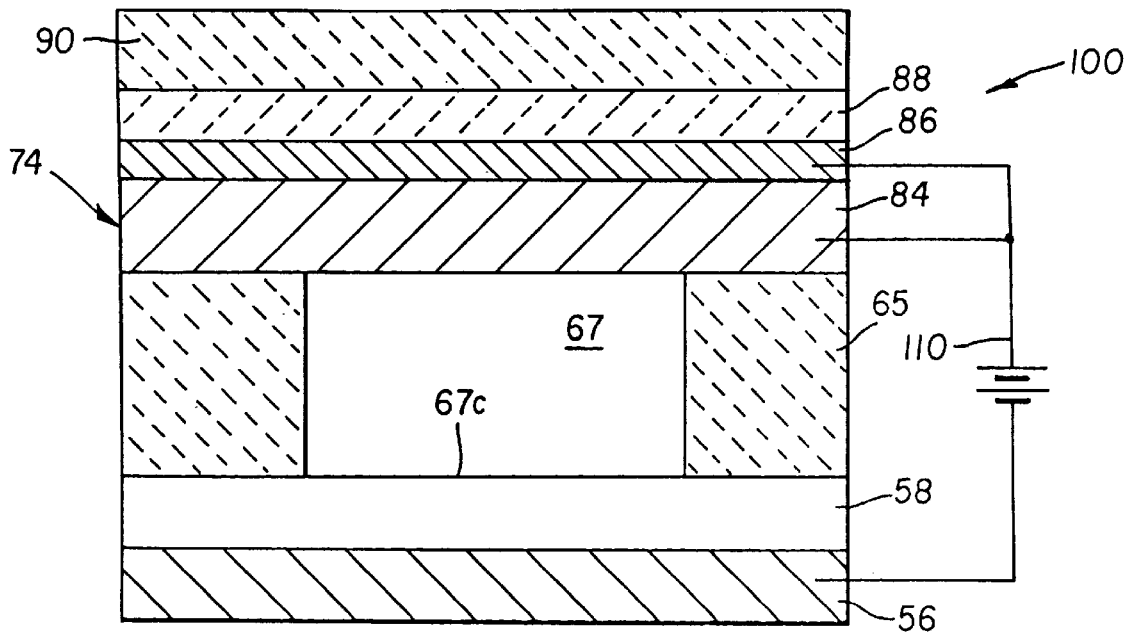
FIG. 7 is a cross-sectional view of the electromechanical grating device having a ribbon structure composed of a tensile-conductive layer, a reflective layer, and optical coatings.

FIG. 7 is a cross-sectional view of another electro-mechanical grating device 100 showing a structural drawing that includes the elements for electro-mechanical actuation. The device structure is the same as that of FIG. 6 except for the ribbon structure 74. The ribbon structure 74 is formed to include the desired characteristics of a conductive surface opposing the base 50, reflectivity and tensile stress using four layers. A first layer 84 opposing the bottom 67c of the channel 67 provides conductive and tensile properties of the ribbon structure 74 and a second layer 86 atop the first layer 84 provides the reflective property and thus intrinsically will be conductive. The first layer 84 consists of a material that is selected from a group that includes titanium aluminide, titanium, tantalum, diamond-like carbon, tungsten silicide, titanium nitride, and tantalum nitride. The second layer 86 is selected from a group of materials that includes aluminum, chrome, gold, silver and other standard materials or alloys used for optical mirrors. A third layer 88 on top the second layer 86 is a first optical coating having a lower index of refraction than a fourth layer 90, which is a second optical coating on top the third layer 88. The thicknesses of these layers are optimized according to optical thin-film coating design rules as applied to a grating device. The materials for layers 88 and 90 are expected to be from a group of materials used for standard optical coatings and not significantly contribute to the conductivity or tension of the ribbon structure 74. The ribbon structure 74 is patterned as discussed above to produce the useful electro-mechanical grating device 100. Although the electro-mechanical grating device 100 is depicted with two layers added to enhance the reflectivity properties of the ribbon structure 74, additional layers may be used to further improve the design according to standard design rules for optical thin film coatings.

The thickness and tensile stress of the first layer 84 is chosen to optimize performance by influencing the electrostatic force required for actuation and the returning force, which affects the speed, resonance frequency and voltage requirements of the device. Typical characteristics are tensile intrinsic stress greater than 300 MPa and thickness necessary to achieve full actuation with 15 V or less, which corresponds to between 1000 Å and 5000 Å. The thickness of the second layer 86 is chosen to provide substantially the largest possible reflection, and is chosen based on the extinction ratio of the material for the wavelength of the incident light. For example, if Al is used for the second layer 86, the thickness should be between 300 Å and 2000 Å for visible wavelengths. The third and fourth layers 88 and 90 are chosen based on optical think film design techniques that are well known to one skilled in the art. The optical thickness of these layers will be approximately $\lambda/4$, and thus, the layers will be approximately 1000 E thick.

Figure 8:
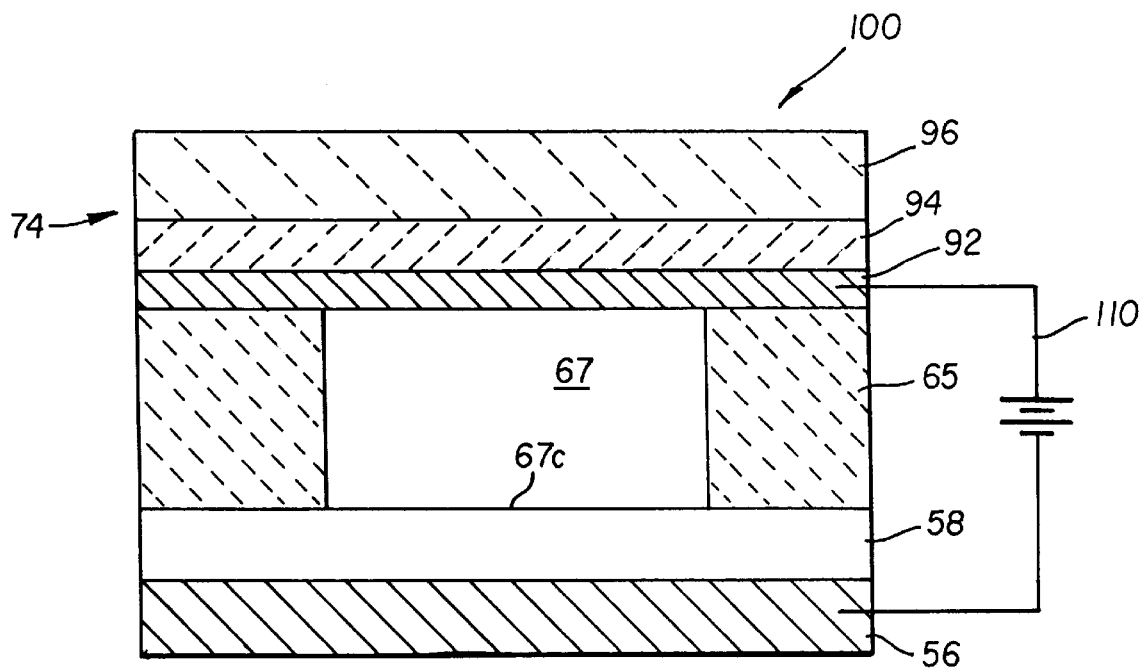
FIG. 8 is a cross-sectional view of the electromechanical grating device having a ribbon structure composed of a conductive-reflective layer and optical coatings with tensile properties.

FIG. 8 is a cross-sectional view of another electro-mechanical grating device 100 showing a structural drawing that includes the elements for electro-mechanical actuation. The device structure is the same as that of FIG. 7 except for the ribbon structure 74. The ribbon structure 74 is formed to include the desired characteristics of a conductive surface opposing the base 50, reflectivity and tensile stress using three layers. A first layer 92 opposing the bottom 67c of the channel 67 provides conductive and reflective properties of the ribbon structure 74. The first layer 92 is selected from a group of materials that includes aluminum, chrome, gold, silver and other standard materials or alloys used for optical mirrors. A second layer 94 on top the first layer 92 is a first optical coating having a lower index of refraction than a third layer 96 atop the second layer. The third layer 96 is a second optical coating that also provides the tensile properties needed in the ribbon structure 74 and could be a material such as silicon nitride. The thicknesses of these layers 94 and 96 are optimized according to optical thin-film coating design rules as applied to a grating device. The ribbon structure 74 is patterned as discussed above to produce the useful electro-mechanical device 100. Although the electro-mechanical device 100 is depicted with two layers added to enhance the reflectivity properties of the ribbon structure 74, additional layers may be used to further improve the design according to standard design rules for optical thin film coatings.

The thickness of the first layer 92 is chosen to provide substantially the largest possible reflection, and is chosen based on the extinction ratio of the material for the wavelength of the incident light. For example, if Al is used for the first layer 92, the thickness should be between 300 Å and 2000 Å for visible wavelengths. The second and third layers 94 and 96 are chosen based on optical thin film design techniques that are well known to one skilled in the art. The optical thickness of these layers will be approximately $\lambda/4$, and thus, the layers will be approximately 1000 E thick. The tensile stress of the third layer 96 should be chosen to provide the desired mechanical properties of the ribbon structure 74.

Figure 9:
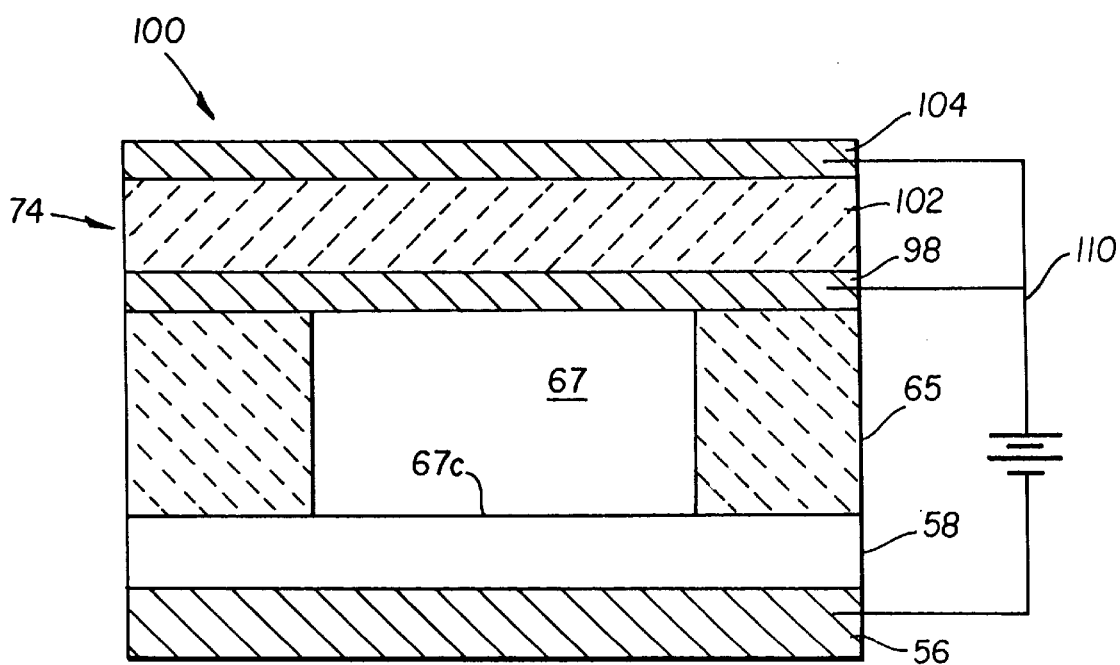
FIG. 9 is a cross-sectional view of the electromechanical grating device having a ribbon structure composed of a conductive layer, a tensile layer, and a reflective layer.

FIG. 9 is a cross-sectional view of another electro-mechanical grating device 100 showing a structural drawing that includes the elements for electro-mechanical actuation. The ribbon structure 74 is formed to include the desired characteristics of a conductive surface structure opposing the base 50, reflectivity and tensile stress using three layers. A first layer 98 opposing the bottom 67c of the channel 67 provides the conductivity of the ribbon structure 74, a second layer 102 on top the first layer 98 provides the tensile property, and a third layer 104 on top the second layer 102 provides the reflectivity. The first layer 98 is selected from a group of materials that is conductive and compatible with the subsequent layer addition (e.g., adhesion and high temperature processing) that includes indium tin oxide, tungsten, tungsten silicide, titanium nitride, and tantalum nitride. The second layer 102 is selected from a group of materials that are tensile but not conductive including silicon nitride, titanium dioxide, and magnesium fluoride. The third layer 104 is selected from a group of materials that includes aluminum, chrome, gold, silver and other standard materials or alloys used for optical mirrors. The ribbon structure 74 is patterned as discussed above to produce the useful electro-mechanical grating device 100.

The first layer 98 should be thin in order to have a negligible effect on the mechanical properties of the device. The only requirement is that a sufficient thickness to possess a uniform potential be maintained, and thus a couple hundred angstroms is sufficient. The thickness and tensile stress of the second layer 102 are chosen to optimize performance by influencing the electrostatic force required for actuation and the returning force, which affects the speed, resonance frequency and voltage requirements of the device. Typical characteristics are tensile intrinsic stress greater than 300 MPa and thickness necessary to achieve full actuation with 15 V or less, which corresponds to between 1000 Å and 5000 Å. The thickness of the third layer 104 is chosen to provide substantially the largest possible reflection, and is chosen based on the extinction ratio of the material for the wavelength of the incident light. For example, if Al is used for the third layer 104, the thickness should be between 300 Å and 2000 Å for visible wavelengths.

Figure 10:
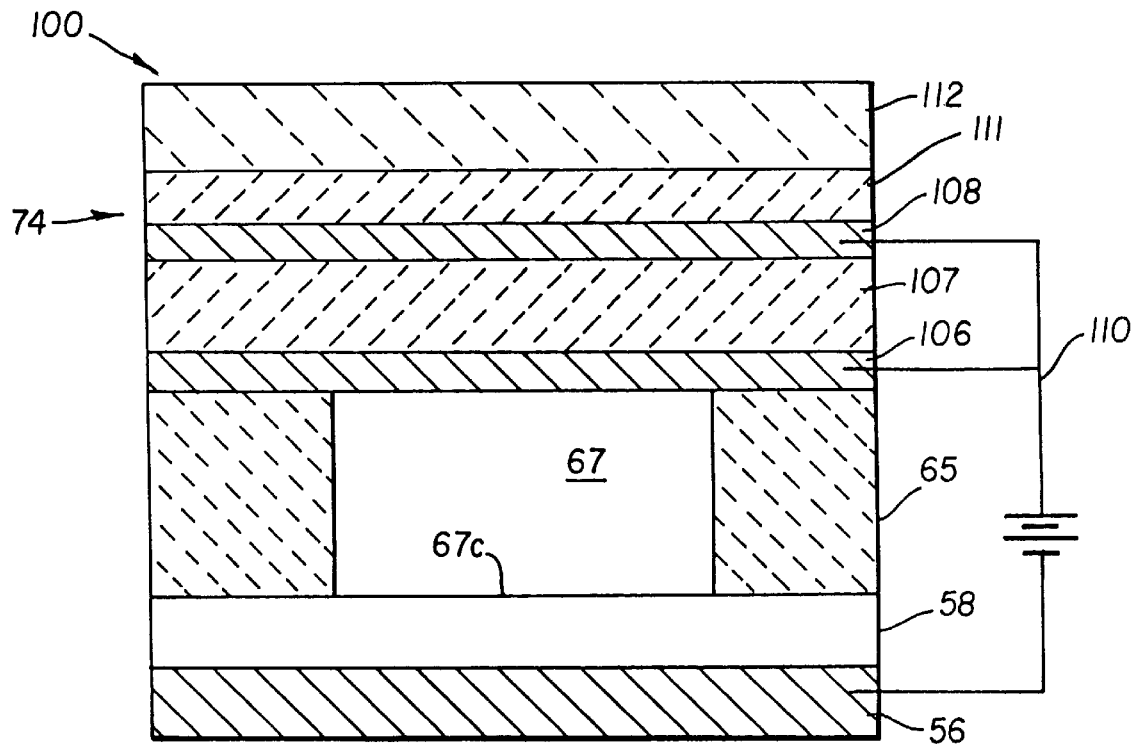
FIG. 10 is a cross-sectional view of the electromechanical grating device having a ribbon structure composed of a conductive layer, a tensile layer, a reflective layer, and optical coatings.

FIG. 10 is a cross-sectional view of another electro-mechanical grating device 100 showing a structural drawing that includes the elements for electro-mechanical actuation. The ribbon structure 74 is formed to include the desired characteristics of a conductive surface opposing the base 50, reflectivity and tensile stress using five layers. A first layer 106 opposing the bottom 67c of the channel 67 provides the conductivity of the ribbon structure 74, and a second layer 107 on top the first layer 106 provides the tensile property, and a third layer 108 on top the second layer 107 provides the reflectivity. The first layer 106 is selected from a group of materials that is conductive and compatible with the subsequent layer addition (e.g., adhesion and high temperature processing) that includes indium tin oxide, tungsten, tungsten silicide, titanium nitride, and tantalum nitride. The second layer 107 is selected from a group of materials that are tensile but not conductive including silicon nitride, titanium dioxide, and magnesium fluoride. The third layer 108 is selected from a group of materials that includes aluminum, chrome, gold, silver and other standard materials or alloys used for optical mirrors. A fourth layer 111 on top the third layer 108 is a first optical coating having a lower refractive index than a fifth layer 112 on top the fourth layer 111, which constitutes a second optical coating. The thicknesses of these layers 111 and 112 are optimized according to optical thin-film coating design rules as applied to a grating device. The ribbon structure 74 is patterned as discussed above to produce the useful electro-mechanical grating device 100. Although the electro-mechanical grating device 100 is depicted with two layers added to enhance the reflectivity properties of the ribbon structure 74, additional layers may be used to further improve the design according to standard design rules for optical thin film coatings.

The first layer 98 should be thin in order to have a negligible effect on the mechanical properties of the device. The only requirement is that a sufficient thickness to possess a uniform potential be maintained, and thus a couple hundred angstroms is sufficient. The thickness and tensile stress of the second layer 102 is chosen to optimize performance by influencing the electrostatic force required for actuation and the returning force, which affects the speed, resonance frequency and voltage requirements of the device. Typical characteristics are tensile intrinsic stress greater than 300 MPa and thickness necessary to achieve full actuation with 15 V or less, which corresponds to between 1000 Å and 5000 Å. The thickness of the third layer 104 is chosen to provide substantially the largest possible reflection, and is chosen based on the extinction ration of the material for the wavelength of the incident light. For example, if Al is used for the third layer 104, the thickness should be between 300 Å and 2000 Å for visible wavelengths. The fourth and fifth layers 111 and 112 are chosen based on optical thin film design techniques that are well known to one skilled in the art. The optical thickness of these layers will be approximately $\lambda/4$, and thus, the layers will be approximately 1000 E thick.

The embodiments shown in FIGS. 9 and 10 can also be operated with a voltage applied between the first and third layers 98 and 104 and 106 and 108 respectively of the ribbon structure 74. The electrical contact shown in FIGS. 9 and 10 between layers 98 and 104 and 106 and 108 respectively would then be absent. This provides a binding force to the ribbon structure 74 that can prevent delamination of the first layer 98 and 106 from the second layer 102 and 107 respectively. The first layer 98 and 106 respectively can delaminate from the second layer 102 and 107 respectively if the adhesion force at the interface between layers 98 and 102 and 106 and 107 respectively is less than the force required for the actuation of the ribbon structure 74, which is applied by the voltage source 110 to the first layer 98 and 106 respectively. Charge can be injected into the second layer 102 and 107 a respectively as a result of this voltage, but the trapped charge is screened from the bottom conductor 56 by the conductive first layer 98 and 106 respectively, and therefore the electro-mechanical performance of the device 100 is not affected.

One characteristic of the embodiments shown in FIGS. 7, 8 and 10 is the existence of a stack of dielectric layers 88 and 90, 94 and 96, and 111 and 112 respectively, above the reflector layer 86, 92, and 108 respectively that acts as an optical coating. The purpose of the dielectric optical coating is to alter the reflective properties of the reflective layer 86, 92 and 108 respectively. Likely alterations are enhancement of the reflectivity (or reduction of absorption) at the wavelength of interest, or a shift in the phase accumulated by the reflected light. The former is useful for electro-mechanical grating elements being subjected to high-intensity illumination. The latter can be useful in novel embodiments of GLV structures.

The electro-mechanical grating structure places some limitations on the allowable thickness of the dielectric optical coating stack. Because the width of the ribbon elements 72a and 72b in the preferred embodiment is a few microns or less, the total thickness of the dielectric optical coating must be less than a micron to minimize the effects of the edges of the optical coating.

The effects on the mechanical characteristics of the ribbon elements 72a and 72b must also be considered in the design of GLV devices with optical coatings. The increased thickness will typically increase the electrostatic force required to actuate the ribbon elements 72a or 72b, because of an increase in the bending moment at the ends of the ribbon elements 72a or 72b. In theory, compensation for this effect can be realized by depositing optical films with compressive stress.

Figure 11:
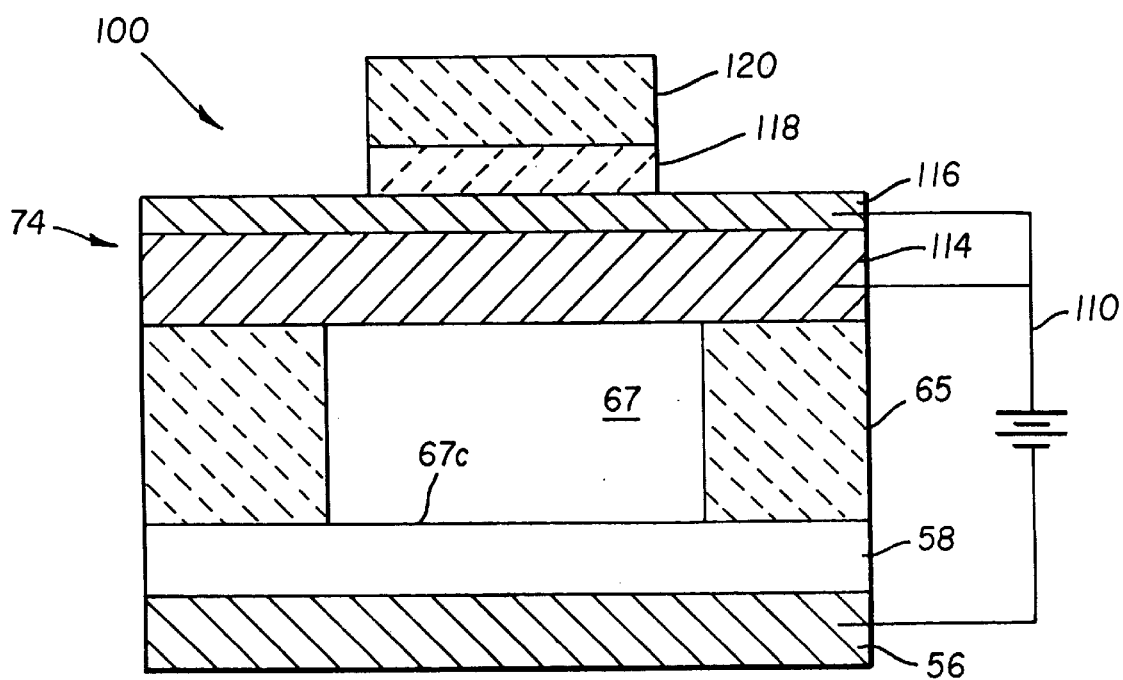
FIG. 11 is a cross-sectional view of the electromechanical grating device having a ribbon structure composed of a tensile-conductive layer, a reflective layer, and optical coatings that have been patterned.

An alternative embodiment that reduces the effects of the optical coating on the electromechanical performance of the ribbon elements 72a and 72b is illustrated in FIG. 11. The device 100 in FIG. 11 is similar to the device in FIG. 6, except the optical film stack comprising layers 118 and 120 is patterned to cover only the central region of the ribbon structure 74. The optical film stack is centered with respect to the channel 67. Thus, the coating will produce the desired optical effects when illuminated at the center with a line focus. It will not as significantly affect the electro-mechanical behavior of the ribbon elements 72a and 72b, because the bending occurs at the portions of the ribbon elements closest to the ends, which are not covered by the optical coating. The only remaining effect is on the restoring force due to the alteration of the tension in the ribbon in the region covered by the optical coating.

In the embodiment illustrated in FIG. 11, the overall stress of the optical coating should preferably be tensile or negligible. A significant compressive stress degrades the device performance by causing the ribbon elements 72a and 72b to bow due to the strain mismatch between the tensile material comprising a first layer 114, opposing the bottom 67c of the channel 67, and the optical coating layers 118 and 120. Ideally, the technique of stress compensation would be used in the optical coating stack, so that its presence would have negligible effect on the performance of the electro-mechanical grating device 100.

The embodiment shown in FIG. 11 illustrates the use of the patterning method on a structure with the ribbon structure 74 composition disclosed in FIG. 7. It is easily understood that the same patterning method can be used to form an embodiment with the ribbon structure 74 composition disclosed in FIG. 10 with reduced electromechanical effects from the optical coating layers 88 and 90.

The embodiments shown in FIGS. 5 through 11 eliminate the effect of charge build-up in dielectrics, primarily silicon nitride, that are part of the ribbon structure 74. This appears to be the most common scenario for charging. However, it is conceivable that charge can be injected into the protective layer 58 when a conductive beam is used. Alternatively, surface charges can be formed on the surface of the dielectric protective layer 58 through contact with the ribbon elements 72a or 72b. Either scenario would significantly degrade device performance if a sufficient charge is built up. The electro-mechanical grating device 100 illustrated in FIG. 2 includes a series of conductive screening elements 62 and standoffs 64 that can be used to prevent charge injection from the ribbon elements 72a and 72b into the protective layer 58 or onto the top surface of the base 50.

Figure 12:
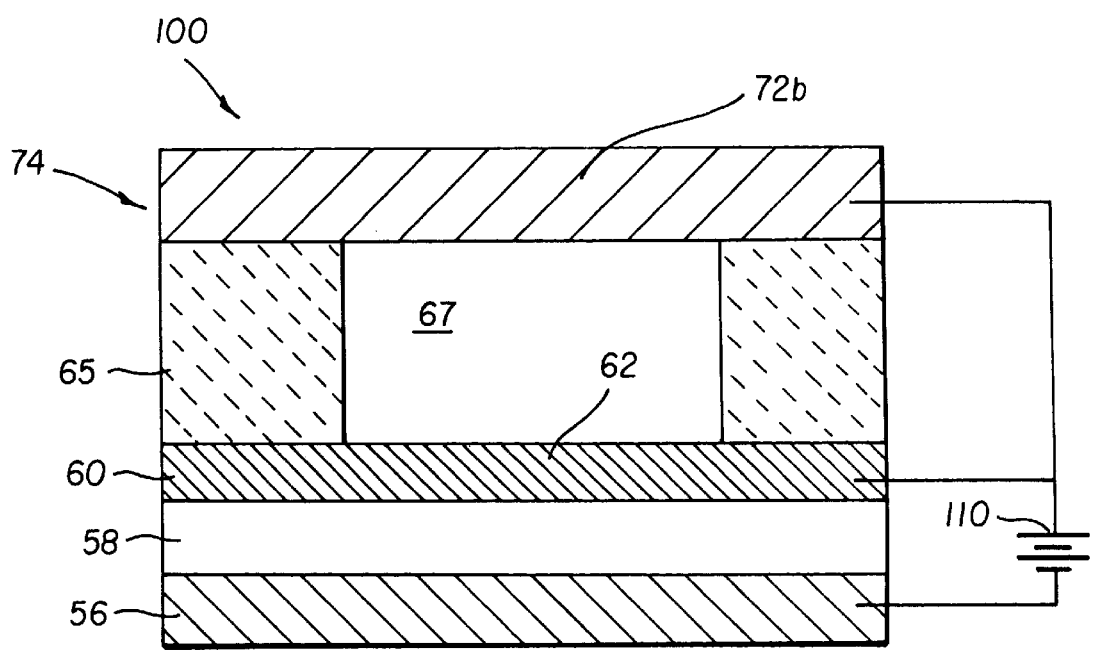
FIG. 12 is a cross-sectional view of the electro-mechanical grating device of FIG. 2 showing the stationary ribbons suspended over conductive screening features.

The deformable ribbon elements 72b are aligned to the pattern in the conductive standoff layer 60 such that they are directly over the screening features 62, as illustrated in the cross-sectional view in FIG. 12. Because the ribbon elements 72b and the screening features 62 are at the same potential, no electrostatic force is exerted on the ribbon elements 72b when a voltage is applied by the voltage source 10 between the conductive ribbon structure 74 and the bottom conductive layer 56. Therefore, the deformable ribbon elements 72b remain stationary regardless of the applied voltage.

Figure 13:
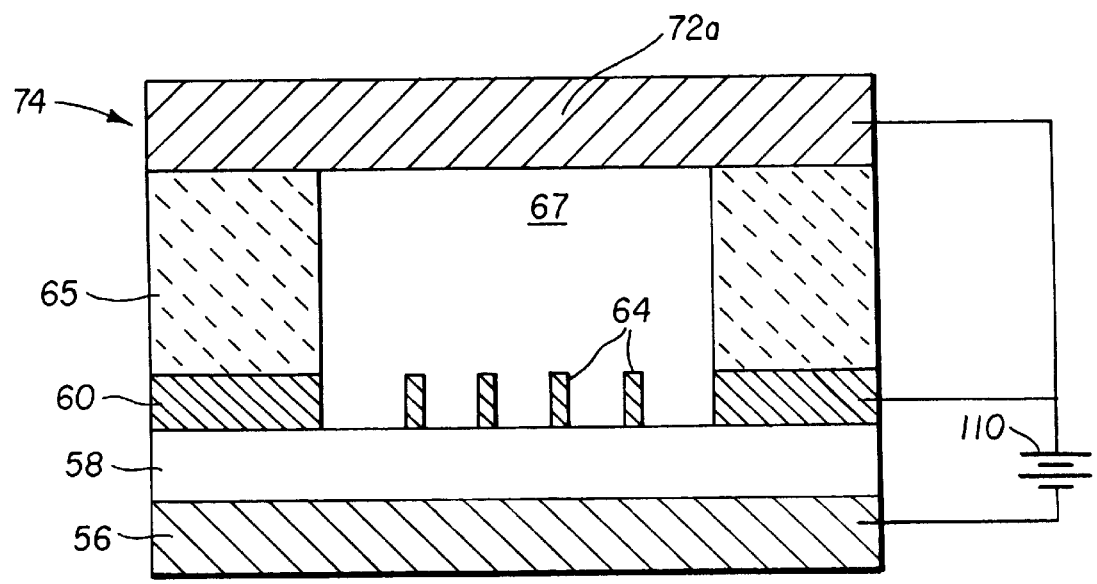
FIG. 13 is a cross-sectional view of the mechanical grating device of FIG. 2 showing the movable ribbons suspended over conductive standoffs.

The deformable ribbon elements 72a are aligned to the pattern in the conductive standoff layer 60 such that they are directly over conductive standoffs 64. This is illustrated in the cross-sectional view in FIG. 13. A voltage applied by the voltage source 110 between the conductive ribbon structure 74 of the deformable ribbon elements 72a and the bottom conductive layer 56 results in an electrostatic force being applied to the deformable ribbon elements 72a in the large gaps between conductive standoffs 64. Thus, these ribbon elements 72a can be actuated until contact is made between the conductive bottom surface of the deformable ribbon elements 72a and the top surface of the conductive standoffs 64.

The inclusion of the conductive standoffs 64 improves the device for two reasons. First, no metal-dielectric interface is created during the actuation of ribbon elements 72a that could lead to creation of surface charges or injection of charge into the protective layer 58 from the ribbon elements 72a. It is possible that charge could be injected into the protective layer 58 from the screening elements 62 and the conductive standoffs 64. However, the effect of this charge on the electro-mechanical performance of the device should be insignificant due to the electric field screening provided by those conductive features 62 and 64. The reduction in contact surface area that results from the use of the conductive standoffs 64 also improves the reliability of the device by reducing the probability of stiction.

The invention has been described in detail with particular reference to certain preferred embodiments thereof, but it will be understood that variations and modifications can be effected within the spirit and scope of the invention.

PARTS LIST 50 base
52 substrate
56 bottom conductive layer
58 protective layer
60 conductive standoff layer
62 conductive screening element
64 conductive standoff
65 spacerlayer
67 channel
67a first sidewall of the channel
67b second sidewall of the channel
67c bottom of the channel
74 ribbon structure
72a first set of deformable ribbon elements
72b second set of deformable ribbon elements
78a first conducting region
78b second conducting region
80 conductive region
82 single layer
84 first layer
85 first layer
86 second layer
87 second layer
88 third layer (optical coating)
90 fourth layer (optical coating)
92 first layer
94 second layer (optical coating)
96 third layer (optical coating)
98 first layer
100 electro-mechanical grating device
102 second layer
104 third layer
106 first layer
107 second layer
108 third layer
110 voltage source
111 fourth layer (optical coating)
112 fifth layer (optical coating)
114 first layer
116 second layer
118 first optical coating layer
120 second optical coating layer
122 via hole
124 thick conductive layer
160 applied waveform
162 graph
163 graph
165 time at which charging occurs
167 time at which $t_D$ becomes non-zero

What is claimed is:

1. An electro-mechanical grating device comprising
   a base having a surface;
   a channel formed above said base;
   a ribbon structure defining a plurality of spaced apart deformable ribbon elements spanning said channel, said deformable ribbon elements are tensile and reflective, define a reflective top ribbon surface and a bottom ribbon surface and being fabricated of at least one layer opposing the base wherein said layer is conductive; and
   a layer of transparent material on the top ribbon surface for enhancing reflectivity.

2. The electro-mechanical grating device as recited in claim 1 wherein the layer of the ribbon elements opposing the base is conductive and tensile.

3. The electro-mechanical grating device as recited in claim 1 wherein the layer opposing the base is conductive and reflective and the layer of transparent material is tensile.

4. The electro-mechanical grating device as recited in claim 1 wherein the layer opposing the base is conductive and reflective and more than one transparent layers are added for enhancing the reflectivity and at least one of the transparent layers is tensile.

5. The electro-mechanical grating device as recited in claim 1 wherein the layer opposing the base is conductive, an intermediate layer on top of the layer opposing the base is tensile.

6. An electro-mechanical grating device comprising:
   a base having a surface;
   a channel formed above said base; and
   a plurality of spaced apart deformable ribbon elements spanning the channel, said deformable ribbon elements are formed by a single material layer which is tensile, reflective, and conductive.

7. The electro-mechanical grating device as recited in claim 6 wherein the single material layer is selected from a group of materials that includes titanium aluminide, titanium, tantalum, and diamond-like carbon.

8. An electro-mechanical grating device comprising:
   a base having a surface;
   a channel formed above said base;
   a ribbon structure defining a plurality of spaced apart deformable ribbon elements spanning the channel, said deformable ribbon elements are formed by a three layer structure defining a layer opposing the base, an intermediate layer, and a top layer, wherein the layer opposing the base is conductive, the intermediate layer is tensile, and the top layer is reflective; and wherein the layer opposing the base is selected from a group of materials that includes indium tin oxide, tungsten, tungsten silicide, titanium nitride, and tantalum nitride, the intermediate layer is selected from a group of materials that includes silicon nitride, titanium dioxide, and magnesium fluoride and the top layer is selected from a group of materials that includes aluminum, chrome, gold, silver and other standard materials or alloys used for optical mirrors.

9. The electro-mechanical grating device as recited in claim 8 wherein a first optical coating is provided atop the top layer and has a lower refractive index than a second optical coating atop said first optical coating and wherein the thicknesses of the first and second optical coatings are optimized according to optical thin-film coating design rules as applied to an electro-mechanical grating device.

10. An electro-mechanical grating device comprising:

a base having a surface;

a channel formed above said base; and a ribbon structure defining plurality of spaced apart deformable ribbon elements spanning the channel, said deformable ribbon elements are formed by a three layer structure defining a layer opposing the base, an intermediate layer on top of the layer opposing the base, and a top layer, wherein the layer opposing the base is conductive and reflective, the intermediate layer is transparent, and the top layer is transparent and tensile.

11. The electro-mechanical grating device as recited in claim 10 wherein the layer opposing the base is selected from a group of materials that includes aluminum, chrome, gold, silver and other standard materials or alloys used for optical mirrors.

12. The electro-mechanical grating device as recited in claim 11 wherein the refractive index of the top layer is greater than the refractive index of the intermediate layer.

13. The electro-mechanical grating device as recited in claim 12 wherein at least one optical coating for enhancing the reflectivity is provided on top of the top layer.

14. An electro-mechanical grating device comprising:

base having a surface;

a channel formed above said base; and a ribbon structure defining plurality of spaced apart deformable ribbon elements spanning the channel, said deformable ribbon elements are a four layer structure defining a layer opposing the base, a first and a second intermediate layer, and a top layer, wherein the layer opposing the base is conductive and tensile, the first intermediate layer is reflective, and the second intermediate layer and the top layer are transparent.

15. The electro-mechanical grating device as recited in claim 14 wherein the layer opposing the base consists of a material that is selected from a group that includes titanium aluminide, titanium, tantalum, diamond-like carbon, tungsten silicide, titanium nitride, and tantalum nitride and the first intermediate layer is selected from a group of materials that includes aluminum, chrome, gold, silver and other standard materials or alloys used for optical mirrors.

16. The electro-mechanical grating device as recited in claim 14 wherein the refractive index of the top layer is greater than the refractive index of the second intermediate layer.

17. The electro-mechanical grating device as recited in claim 14 wherein at least one of the second intermediate layer and the top layer contribute significantly to the tension in the deformable ribbon elements.

18. The electro-mechanical grating device as recited in claim 14 wherein at least one optical coating for enhancing the reflectivity is provided on top of the top layer.

19. An electro-mechanical grating device comprising:

base having a surface;

a channel formed above said base; and a ribbon structure defining plurality of spaced apart deformable ribbon elements spanning the channel, said deformable ribbon elements are tensile and reflective, define a top ribbon surface and a bottom ribbon surface and being fabricated of at least one layer opposing the base wherein said layer is conductive; and a plurality of conductive standoffs patterned on said base and in relation to said deformable ribbon elements.

20. The electro-mechanical grating device as recited in claim 19 wherein the layer opposing the base is selected from a group of materials that includes titanium aluminide, titanium, tantalum, and diamond-like carbon.

21. The electro-mechanical grating device as recited in claim 19 wherein said ribbon elements are formed by a three layer structure defining a layer opposing the base, an intermediate layer, and a top layer, wherein the layer opposing the base is conductive, the intermediate layer is tensile, and the top layer is reflective.

22. The electro-mechanical grating device as recited in claim 21 wherein the layer opposing the base is selected from a group of materials that includes indium tin oxide, tungsten, tungsten silicide, titanium nitride, and tantalum nitride, the intermediate layer is selected from a group of materials that includes silicon nitride, titanium dioxide, and magnesuim flouride and the top layer is selected from a group of materials that includes aluminium, chrome, gold, silver and other standard materials of alloys used for optical mirrors.

23. The electro-mechanical grating device as recited in claim 19 wherein said ribbon elements are formed by a three layer structure defining a first layer opposing the base, an intermediate layer on top of the layer opposing the base, and a top layer, wherein the layer opposing the base is conductive and reflective, the intermediate layer is transparent, and the top layer is transparent and tensile, and wherein the layer opposing the base is selected from a group of materials that includes aluminum, chrome, gold, silver and other standard materials or alloys used for optical mirrors.

24. The electro-mechanical grating device as recited in claim 23 wherein the refractive index of the top layer is greater than the refractive index of the intermediate layer.

25. The electro-mechanical grating device as recited in claim 23 wherein at least one optical coating for enhancing the reflectivity is provided on top of the top layer.

* * * * *